Sept. 10, 1963 G. E. MARTIN 3,103,399

STRAIN RELIEF DEVICE

Filed Dec. 7, 1960 2 Sheets-Sheet 1

INVENTOR
GLENN E. MARTIN

BY Donald F Voss

ATTORNEY

Sept. 10, 1963 G. E. MARTIN 3,103,399

STRAIN RELIEF DEVICE

Filed Dec. 7, 1960 2 Sheets-Sheet 2

United States Patent Office 3,103,399
Patented Sept. 10, 1963

3,103,399

STRAIN RELIEF DEVICE

Glenn E. Martin, Vestal, N.Y., assignor to International Business Machines Corporation, New York, N.Y., a corporation of New York Filed Dec. 7, 1960, Ser. No. 74,278
2 Claims. (Cl. 339—17)

This invention relates to strain relief devices for electrical conductors and, more particularly, to a strain relief device for a series of electrical conductors or cables which terminate with and are attached to a series of parallel conductors adherent to a dielectric panel pluggable into a receptacle.

The strain relief device functions in a manner that any strain applied to the cables will be contained at the strain relief device and will not be transmitted to the connections joining the cables and the conductors adherent to the dielectric panel. The particular cables leading to the conductors which are adherent to the dielectric panel are usually joined by solder connections.

The conductors adherent to the pluggable dielectric panel are formed by well-known techniques for producing printed circuitry. The so-formed conductors terminate along one edge or end of the dielectric panel and extend in an opposite direction to a series of apertures located centrally of the panel. The cable leads project through the apertures from the opposite side and are connected to the conductors by solder fillets. The strain relief device of the present invention is attached to the other end of the dielectric panel.

The strain relief device consists of a base member having two longitudinally spaced elongated slots for receiving a loop portion of the cables which are depressed therein to take the shape of a loop by means of an insertable resilient plug. The plug is provided with a pair of shouldered arm elements which engage overhanging ledges of elements upstanding from the base member to be held thereby in the inserted position.

Accordingly, it is a prime object of the invention to provide an improved strain relief device for cables connected to a dielectric panel.

Another very important object of the invention is to provide a strain relief device which incorporates unitary mating elements.

Still another object of the invention is to provide a strain relief device which is self-locking.

Yet another object of the invention is to provide a strain relief device which is relatively inexpensive.

The foregoing and other objects, features and advantages of the invention will be apparent from the following more particular description of a preferred embodiment of the invention, as illustrated in the accompanying drawings.

Figure 1:
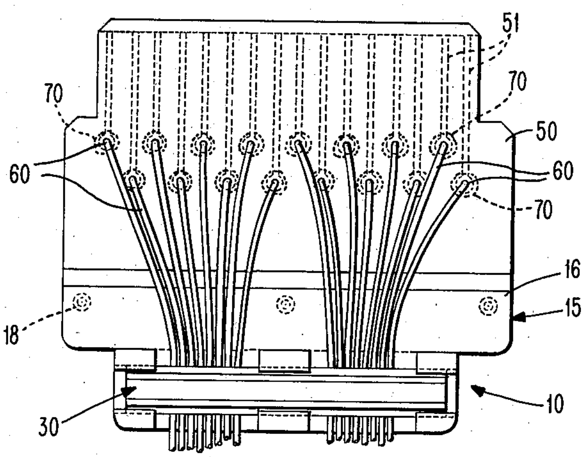
FIG. 1 is a plan view showing the strain relief device attached to a dielectric panel in a manner to contain any strain applied to the cables which are solder connected to the conductors adherent to the dielectric panel.
Figure 2:
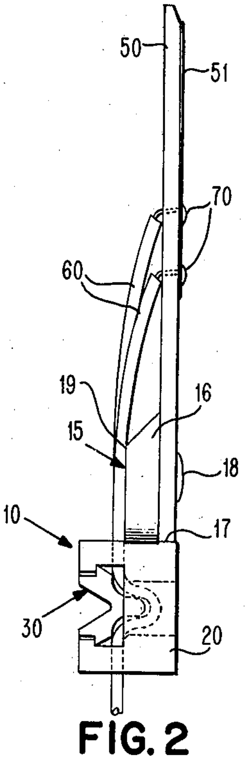
FIG. 2 is a side elevational view of the strain relief device and dielectric panel.

Referring to the drawings and particularly to FIGS. 1 and 2, the invention is illustrated by way of example as a strain relief device 10 attached to a dielectric panel 50 so as to substantially prevent the transmission of any strain applied to electric insulated wires 60 to solder connections or joints 70 which join the ends of the wires 60 with conductors 51 adherent to the dielectric panel 50.

The strain relief device 10, FIGS. 1 and 2, includes a base member 15 and a plug 30. The base member 15 in this example is a unitary piece and is formed by a molding process. The base member 15 could be fabricated in numerous other ways, such as by machining a block of material, without departing from the spirit of the invention. Along these lines, the base can be made from any suitable material. Polypropylene, a flame retardant material, has been found to be very suitable. The base member 15 is rather rigid relative to the plug 30. However, this relationship can be varied as the situation requires.

Figure 5:
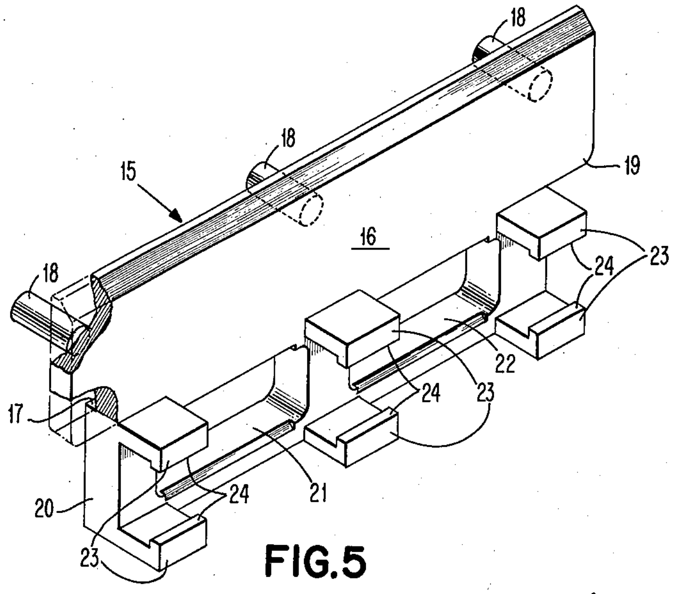
FIG. 5 is a perspective view of the base member of the strain relief device.
Figure 6:
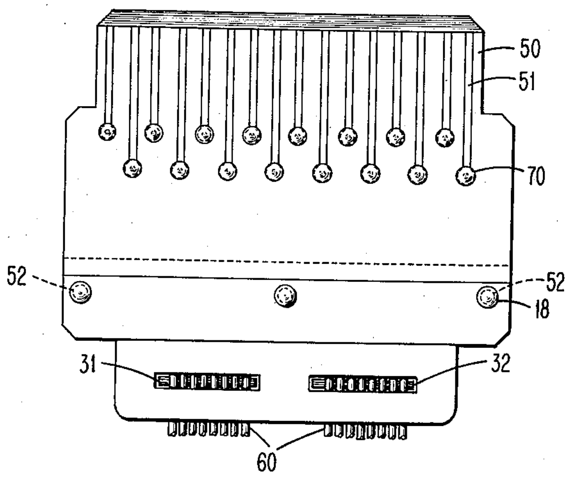
FIG. 6 is a bottom view of the strain relief device and dielectric panel shown in FIG. 1.

The base member 15, FIGS. 1, 2 and 5, includes a support arm 16 provided with a shouldered end opening recess 17 for receiving the upper end of the dielectric panel 50. The support arm 16 is attached to the dielectric panel 50 through the facility of three spaced apart projecting tenons 18 which are received by correspondingly spaced apertures 52, FIG. 6, in panel 50. The tenons 18 project through the apertures 52 and are flattened out, FIGS. 2 and 6, to joint the base member 15 to the panel 50 by a hot upsetting process. In addition to providing a means for joining the base member 15 to the panel 50, the support arm 16 has an upper surface 19, FIGS. 2 and 5, for supporting the wires 60. The support arm 16 extends from a main element 20, FIG. 5, which is provided with two longitudinally spaced oblong openings 21 and 22 for receiving a loop portion of the wires 60.

A series of pillars or lugs 23 upstanding from the body element 20 have overhanging ledges 24 facing toward each other. The pillars 23 arranged in two rows are disposed opposite each other. This arrangement, as it will be seen shortly hereinafter, permits easy insertion and removal of the plug 30.

Figure 3:
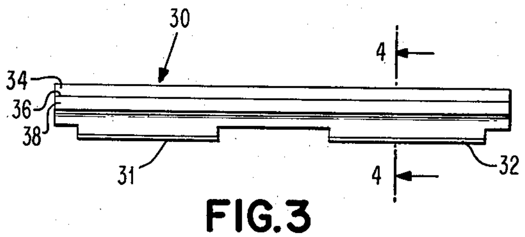
FIG. 3 is a front elevational view of the plug for the strain relief device.
Figure 4:
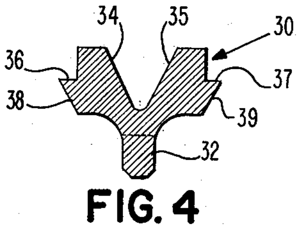
FIG. 4 is an enlarged sectional view taken on the line 4—4 in FIG. 3.
Figure 7:
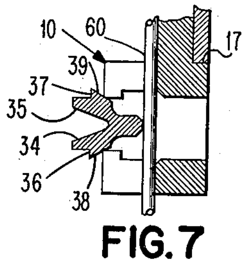
FIG. 7 is a detail view partially in section showing the position of the plug just prior to insertion; and, FIG. 8 is a detail view like FIG. 7 but showing the plug partially inserted.
Figure 8:
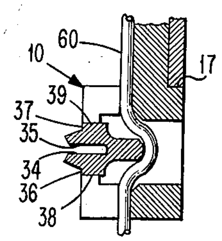

The plug 30, in this example, is also molded from polypropylene. The plug element 30, FIGS. 3 and 4, is generally rectangular and is provided with two downwardly extending lugs 31 and 32 which are longitudinally spaced from each other to correspond to the spacing of the oblong openings 21 and 22. Radii and champfers are provided on both the lugs 31 and 32 and champfers are provided on the mouths of the openings 21 and 22 so as not to damage or rupture the insulation embracing the metallic conductors of the wires 60. The lugs 31 and 32 are adapted to engage the wires 60, FIG. 7, and displace portions thereof, FIG. 8, into the openings 21 and 22 whereby the displaced portions of the wires are caused to take the shape of a loop as seen in FIG. 2. The loop portions of the wires act as buffers to absorb any strain applied to the wires 60.

The lugs 31 and 32 are joined to a base formed by the juncture of a pair of divergently extending shouldered arm elements 34 and 35, FIG. 4. Shoulders 36 and 37 of arms 34 and 35 are adapted to engage and lock with the oppositely extending overhanging ledges 24 of pillars 23, as in FIG. 2. The plug 30 is inserted into and removed from the base member 15 by moving the arm elements 34 and 35 toward each other so that the shoulders 36 and 37 are clear of the ledges 24. The arm elements 34 and 35 are cammed toward each other through the facility of camming surfaces 38 and 39, FIGS. 2, 7 and 8, when inserted into the base member 15. The plug 30 may be inserted into the base member 15 either manually or by machine. The entire strain relief device 10 is adapted to be automatically formed and assembled by machine. Further, since the arms 34 and 35 lock with ledges 24 of the pillars 23 rather than continuous members, the arms 34 and 35 are readily accessible and can be gripped so as to be moved toward each other to disengage from the ledges 24 to enable the removal of the plug 30. Of course, continuous members could be substituted for the pillars without departing from the spirit of the invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In combination, a dielectric panel having a plurality of apertures; a series of conductors adherent to said dielectric panel and extending from one edge thereof to said apertures; a series of electrical wires each having one end thereof passing through one of said apertures and connected to one of said conductors; and a strain relief device consisting of a body member and an insertable plug, said body member being attached to said dielectric panel and having a through passageway through which said wires extend, an intersecting passage having a mouth, and first and second portions of predetermined cross-sectional area, said mouth being less in cross-section than said first portion and said first portion being greater in cross-section than said second portion, said plug having a central lug for urging a portion of said wires into said second portion of said intersecting passage; and a pair of diverging arm elements being deflectable toward each other to enable entry thereof into said first portion through said mouth, said arms returning to a normal condition after entry in said first portion to engage the ledge formed between said mouth and said first portion.

2. A strain relief device comprising:

a body member having a vertically extending through passage;

a first pair of laterally spaced pillars fixed to said body member to extend upwardly therefrom, each pillar of said first pair of pillars having an overhanging ledge facing inwardly;

a second pair of laterally spaced pillars longitudinally spaced from said first pair of pillars and fixed to said body member to extend upwardly therefrom, each pillar of said second pair of pillars having an overhanging ledge facing inwardly; and, a resilient plug having a central lug for engaging with said body member in said through passage thereof, said lug having a configuration to permit wires to pass into said through passage around said lug and out of said through passage and to prevent lateral displacement of said plug relative to said body member and a pair of arms divergently extending from said central lug, each arm having an outwardly extending longitudinal shoulder, the shoulders engaging the overhanging ledges of said first and second pair of pillars to lock therewith and being grippable in between said first and second pair of pillars to facilitate removal of said resilient plug from said body member.

References Cited in the file of this patent

UNITED STATES PATENTS

| | | |
|---|---|---|
| 2,587,239 | Smith | Feb. 26, 1952 |
| 2,854,502 | Richter | Sept. 30, 1958 |
| 2,896,188 | Kearney | July 21, 1959 |
| 2,932,810 | Novak | Apr. 12, 1960 |